United States Patent
Horng et al.

(10) Patent No.: US 11,527,937 B2
(45) Date of Patent: Dec. 13, 2022

(54) MOTOR AND CEILING FAN INCLUDING THE MOTOR

(71) Applicant: Sunonwealth Electric Machine Industry Co., Ltd., Kaohsiung (TW)

(72) Inventors: Alex Horng, Kaohsiung (TW); Kun-Ta Yang, Kaohsiung (TW); Chia-Wei Hsiao, Kaohsiung (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 308 days.

(21) Appl. No.: 16/671,265

(22) Filed: Nov. 1, 2019

(65) Prior Publication Data

US 2020/0220426 A1 Jul. 9, 2020

(30) Foreign Application Priority Data

Jan. 4, 2019 (TW) ................................ 108100378

(51) Int. Cl.
*H02K 7/08* (2006.01)
*F04D 25/08* (2006.01)
*H02K 7/00* (2006.01)

(52) U.S. Cl.
CPC ........... *H02K 7/086* (2013.01); *F04D 25/088* (2013.01); *H02K 7/003* (2013.01); *H02K 7/083* (2013.01)

(58) Field of Classification Search
CPC .......... H02K 7/08; H02K 7/086; H02K 7/003; H02K 7/083; H02K 1/2786; H02K 1/187; F04D 25/088; F04D 29/04; F16C 2380/26; F16C 19/56

USPC ........................................................... 310/89
See application file for complete search history.

(56) References Cited

U.S. PATENT DOCUMENTS

| | | | | |
|---|---|---|---|---|
| 4,865,162 A * | 9/1989 | Morris | ..................... | B60T 1/065 188/72.8 |
| 5,062,721 A * | 11/1991 | Chiba | ..................... | F16C 33/28 384/536 |
| 5,135,365 A * | 8/1992 | Bogage | ................. | F04D 25/088 416/244 R |
| 5,788,023 A * | 8/1998 | Schoner | .................. | F16D 65/00 188/158 |
| 5,971,110 A * | 10/1999 | Martin | .................... | F16D 65/18 188/158 |
| 6,700,257 B2 * | 3/2004 | Lin | ....................... | F04D 29/057 310/67 R |
| 8,770,949 B2 * | 7/2014 | Noble | .................. | F04D 25/068 417/410.1 |

(Continued)

FOREIGN PATENT DOCUMENTS

| CN | 105322673 A | 2/2016 |
|---|---|---|
| CN | 206492770 U | 9/2017 |

(Continued)

*Primary Examiner* — Tulsidas C Patel
*Assistant Examiner* — Viswanathan Subramanian
(74) *Attorney, Agent, or Firm* — Alan D. Kamrath; Karin L. Williams; Mayer & Williams PC (57) ABSTRACT

A motor including a support unit, a first rotating part, a second rotating part, a rotor and a stator is disclosed. The support unit includes an axle and a bearing coupled with the axle. The first rotating part is fit around the axle and is coupled with the bearing. The second rotating part is coupled with the first rotating part. The rotor is coupled with the second rotating part. The stator is connected to the support unit.

16 Claims, 6 Drawing Sheets

(56) References Cited

U.S. PATENT DOCUMENTS

| | | | |
|---|---|---|---|
| 9,874,214 B2 | 1/2018 | Whitley | |
| 10,527,045 B2* | 1/2020 | Horng | F04D 25/088 |
| 2007/0098511 A1* | 5/2007 | Kikkawa | B23B 31/265 |
| | | | 409/231 |
| 2009/0020379 A1* | 1/2009 | Hanna | F16D 65/12 |
| | | | 188/218 XL |
| 2010/0003140 A1* | 1/2010 | Best | F04D 29/329 |
| | | | 416/204 R |
| 2015/0333592 A1* | 11/2015 | Yin | F04D 29/646 |
| | | | 310/51 |
| 2017/0370367 A1 | 12/2017 | Horng et al. | |
| 2018/0347573 A1* | 12/2018 | Horng | H02K 1/30 |
| 2019/0115799 A1 | 4/2019 | Horng et al. | |

FOREIGN PATENT DOCUMENTS

| | | |
|---|---|---|
| CN | 108988555 A | 12/2018 |
| DE | 488957 C | 1/1930 |

\* cited by examiner

MOTOR AND CEILING FAN INCLUDING THE MOTOR

CROSS REFERENCE TO RELATED APPLICATION

The application claims the benefit of Taiwan application serial No. 108100378, filed on Jan. 4, 2019, and the entire contents of which are incorporated herein by reference.

BACKGROUND OF THE INVENTION

1. Field of the Invention

The present invention generally relates to a motor and an air-driving device including the motor and, more particularly, to a motor and a ceiling fan including the motor.

2. Description of the Related Art

Figure 1:
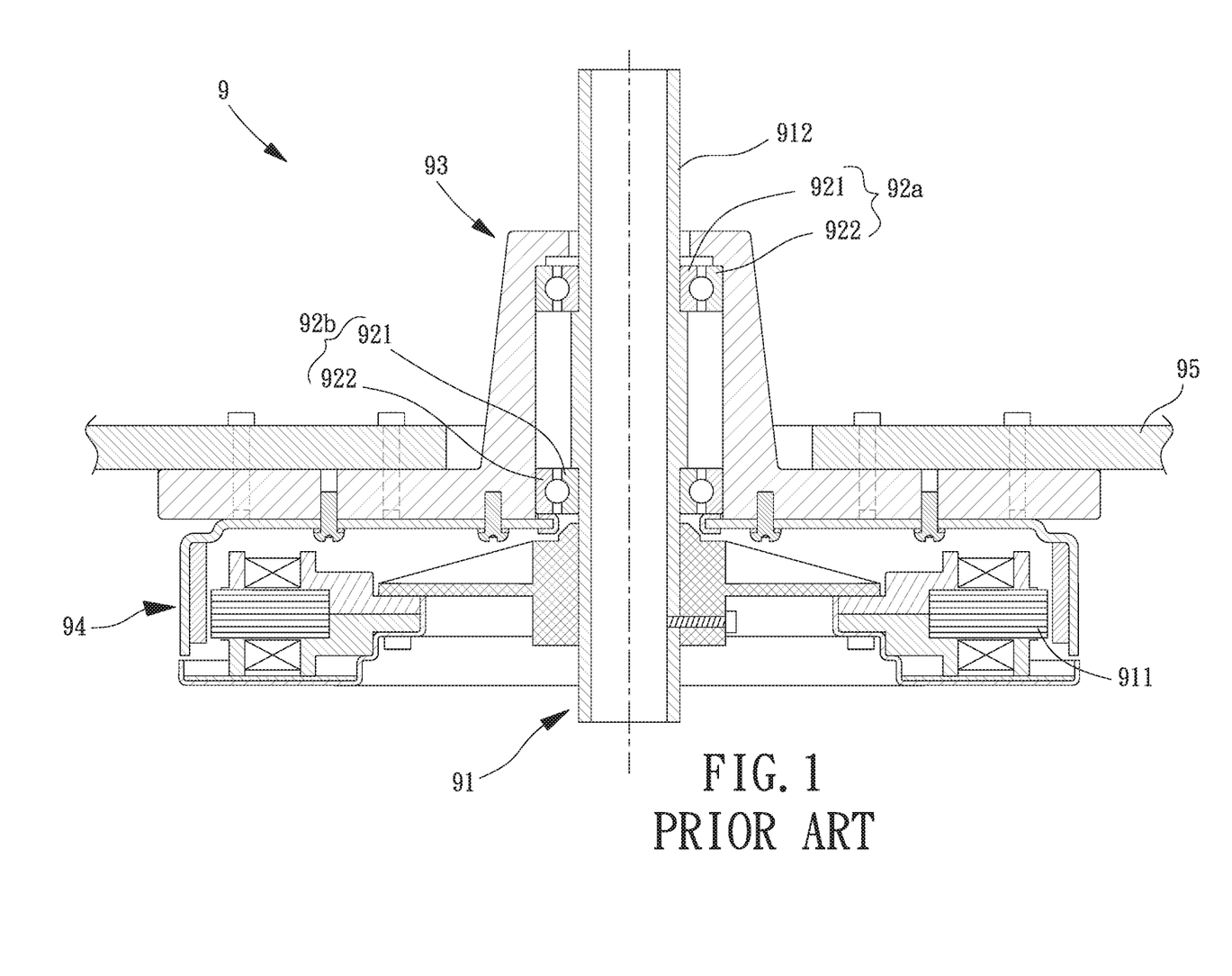
FIG. 1 is a cross sectional view of a conventional ceiling fan.

FIG. 1 shows a conventional ceiling fan 9 including a stator 91, an upper bearing 92a, a lower bearing 92b, a rotary member 93, a rotor 94 and a plurality of blades 95. The stator 91 includes an iron core 911 fixed to a shaft 912. Each of the upper bearing 92a and the lower bearing 92b includes an inner race 921 coupled with the shaft 912. The upper bearing 92a further includes an outer race 922 coupled with an upper part of the inner periphery of the rotary member 93. The upper bearing 92a further includes an outer race 922 coupled with an upper part of the inner periphery of the rotary member 93. The lower bearing 92b further includes an outer race 922 coupled with a lower part of the inner periphery of the rotary member 93. The rotor 94 and the plurality of blades 95 are mounted to the rotary member 93. An example of such a ceiling fan 9 is seen in U.S. Patent Publication No. 2017/0370367 (Taiwan Patent No. 1617743).

Large ceiling fans with a diameter size of 4 meters or more have been developed for use in occasions such as plants, warehouses, venues or livestock farming houses. In this regard, when the size of the ceiling fan becomes larger, the inner space of the rotary member 93 is deeper. This makes it difficult to insert the upper bearing 92a into the rotary member 93 from below and to properly position the upper bearing 92a in the inner space of the rotary member 93. As a result, the assembly efficiency is low. When the upper bearing 92a and/or the lower bearing 92b is slanted in the inner space of the rotary member 93 or is not properly installed, the operation of the ceiling fan 9 would be unstable.

In light of this, it is necessary to improve the conventional ceiling fan 9.

SUMMARY OF THE INVENTION

It is therefore the objective of this invention to provide a motor and a ceiling fan including the motor whose rotating mechanism can be separated into independent parts for separate assemblies, thereby improving convenience, efficiency and quality in assembly.

It is another objective of the invention to provide a motor and a ceiling fan including the motor which ensure the concentricity between the individual parts of the rotating mechanism as separated, thus improving the stability in rotation.

It is a further objective of the invention to provide a motor and a ceiling fan including the motor, in which the individual parts of the rotating mechanism can be made of different materials in order to attain the required wearability of the individual parts of the rotating mechanism or to reduce the weight of the motor and the ceiling fan.

It is yet a further objective of the invention to provide a motor and a ceiling fan including the motor which permit the use of different types of bearings to securely support the ceiling fan components while reducing the cost.

In an aspect, a motor including a support unit, a first rotating part, a second rotating part, a rotor and a stator is disclosed. The support unit includes an axle extending along an axial direction, a bearing, a support bearing, and an auxiliary bearing. The axle has a first end and a second end opposite the first end in the axial direction, and the axle has a shoulder portion protruding radially outward from the axle. A bearing coupled with the axle by fitting around the bearing-abutting shoulder from the first end. The first rotating part has an abutting portion, a first abutting face and a second abutting face respectively located on an inner side of the first rotating part. The first rotating part fits around the axle from the first end, the bearing contacts to the first abutting face, and the support bearing contacts the abutting portion and the second abutting face. The second rotating part is coupled with the first rotating part from the second end. The second rotating part includes an inner space. The bearing is partially received in the inner space, and the auxiliary bearing is received in the inner space. The rotor is coupled with the second rotating part. The stator is connected to the support unit. The auxiliary bearing is coupled with a portion of the axle adjacent to the second end. The auxiliary bearing and the bearing are spaced apart from each other by a distance in the axial direction.

In another aspect, a ceiling fan including the motor and a plurality of air-driving units is disclosed. The plurality of air-driving units is coupled with the second rotating part.

Based on the above, in the motor and the ceiling fan including the motor according to the invention, the rotating mechanism of the motor can be separated into different parts, in which each of the rotating parts is coupled with the respective bearing at the end thereof. In this arrangement, the assembly of the motor is convenient. Also, it can be easily checked that whether the individual rotating parts are properly assembled, thereby significantly improving the convenience, efficiency and quality in assembly.

In a form shown, the bearing includes an inner race coupled with the axle and an outer race radially aligned with the inner race, and an inner periphery of each of the first rotating part and the second rotating part abuts the outer race of the bearing. This ensures the concentricity between the first rotating part and the second rotating part and improves the stability in rotation.

In the form shown, an interconnected part of the first rotating part and the second rotating part is around a middle of an outer periphery of the outer race of the bearing. This ensures that the outer race has substantially the same contact area with the second rotating part and the first rotating part, reinforcing the engagement between the outer race and the second rotating part and the first rotating part.

In the form shown, the support unit includes a support bearing coupled with the axle. The support bearing includes a retaining ring fit around the axle and a rotating ring rotatable relative to the retaining ring. The rotating ring abuts an abutting portion formed on the inner periphery of the first rotating part. In this regard, the weight of the motor or the rotating mechanism of the ceiling fan is mainly transmitted to the rotating ring of the support bearing through the first rotating part, significantly lowering the burden of the bearing. Thus, the bearing can be implemented by a regular bearing instead of an expensive specific-purpose bearing that is particularly used to support a heavy weight. In this regard, the total cost of the support bearing and the other bearings is even significantly lower than the cost of a single specific-purpose bearing, thereby reducing the cost of the motor as well as the likelihood of breakage.

In the form shown, the motor further includes a buffering pad sandwiched between the retaining ring and the inner race of the bearing and fit around the axle, and the buffering pad is off contact with the rotating ring and the outer race of the bearing. The arrangement of the buffering pad reduces the vibration force between the support bearing and the bearing and reinforcing the engagement between the support bearing and the bearing.

In the form shown, the first rotating part includes an oil chamber, and the support bearing is disposed in the oil chamber. As such, the oil chamber is filled with lubricant to improve the smoothness in rotation of the rotating ring of the support bearing.

In the form shown, the first rotating part has a screw hole extending from an outer periphery to the inner periphery of the first rotating part and intercommunicating with the oil chamber of the first rotating part. A screwing ring is engaged with the screw hole. This permits the lubricant to be injected into the oil chamber from the outside while the screwing ring is used to prevent the leakage of the lubricant from. The motor can be taken out of the package box by hanging up the screwing ring, thereby assisting in the removal of the motor. As a result, the convenience in oil injection and assembly is improved.

In the form shown, a rigidity of the second rotating part is lower than a rigidity of the first rotating part. This ensures that the first rotating part, which is the main component for supporting the weight of the rotating mechanism of the motor, has a sufficiently high rigidity. In this regard, the second rotating part which is not the main component for supporting the weight of the rotating mechanism of the motor can be made of a different material from the first rotating part. This can reduce the weight and/or cost of the motor, and provide the required wearability of the individual rotating parts of the motor according to the requirement. Thus, the flexibility of the material design is improved.

In the form shown, the first rotating part is made of iron or steel, and the second rotating part is made of aluminum, magnesium, aluminum alloy, magnesium alloy or aluminum-magnesium alloy. In this arrangement, the weight of the second rotating part can be reduced, advantageously lowering the weight of the motor or the ceiling fan.

In the form shown, the auxiliary bearing has an inner race coupled with the axle and an outer race radially aligned with the inner race thereof. An inner sleeve is coupled with the inner periphery of the second rotating part and abuts the outer race of the auxiliary bearing. A rigidity of the inner sleeve is larger than a rigidity of the second rotating part. In this arrangement, the auxiliary bearing can be abutted by the inner sleeve which has a higher rigidity, which prevents the second rotating part from being abraded by the auxiliary bearing. Advantageously, the repair rate of the motor is lower.

In the form shown, the inner sleeve is made of iron or steel, and the second rotating part is made of aluminum, magnesium, aluminum alloy, magnesium alloy or aluminum-magnesium alloy. Thus, the convenience in manufacturing is improved.

In the form shown, the second rotating part includes a tubular portion coupled with the first rotating part and a disc portion connected to an outer periphery of the tubular portion, and each of the plurality of air-driving units includes a blade having an inner end face. The shape of the inner end face of the blade matches the shape of an outer periphery of the disc portion. Thus, the blades can better fit the outer periphery of the disc portion to avoid forming an obvious gap therebetween, improving the look of the motor.

In the form shown, the inner end face of each blade is formed by laser cutting. Thus, the convenient and precise processing is attained.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "third", "fourth", "inner", "outer", "top", "bottom", "front", "rear", "axial", "radial", "longitudinal", "transverse", "length", "width", "height" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
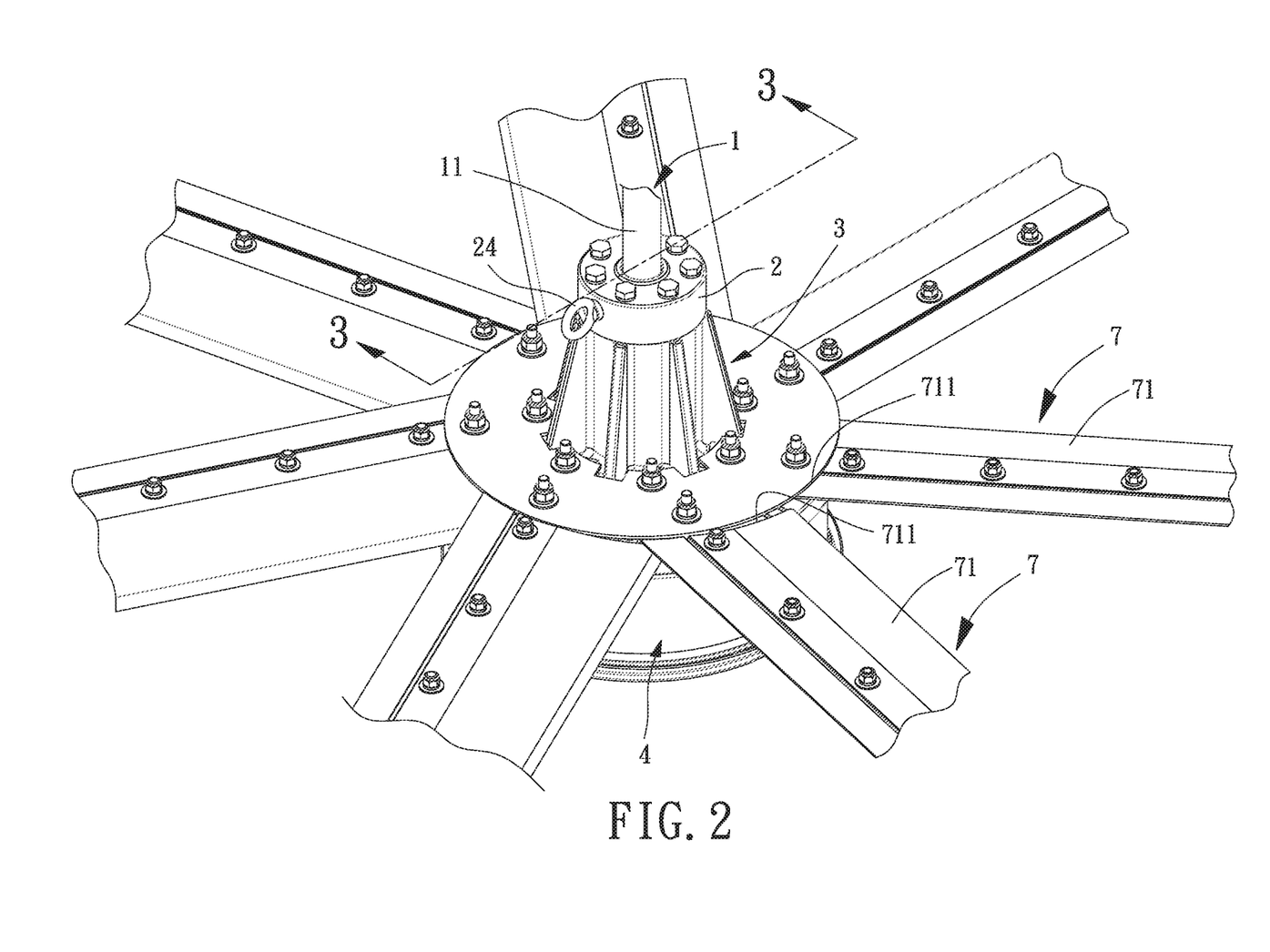
FIG. 2 is a perspective view of a ceiling fan according to a first embodiment of the invention.
Figure 3:
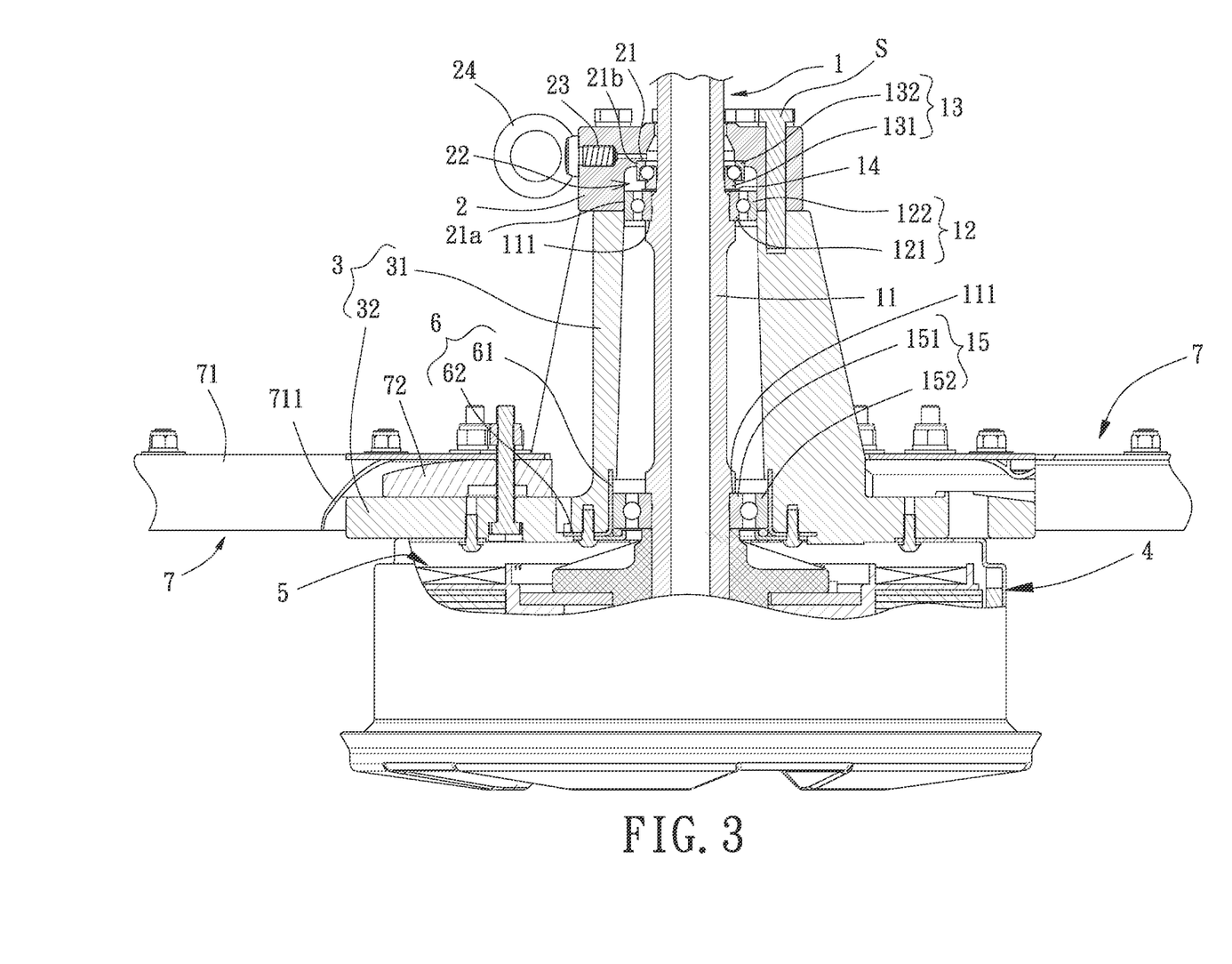
FIG. 3 is a cross sectional view of the ceiling fan taken along line 3-3 in FIG. 2.

FIGS. 2 and 3 show a motor according to a first embodiment of the invention. The motor includes a support unit 1, a first rotating part 2, a second rotating part 3, a rotor 4 and a stator 5. The first rotating part 2 and the second rotating part 3 are rotatably coupled with the support unit 1. The rotor 4 is connected to the second rotating part 3. The stator 5 is connected to the support unit 1.

Figure 4:
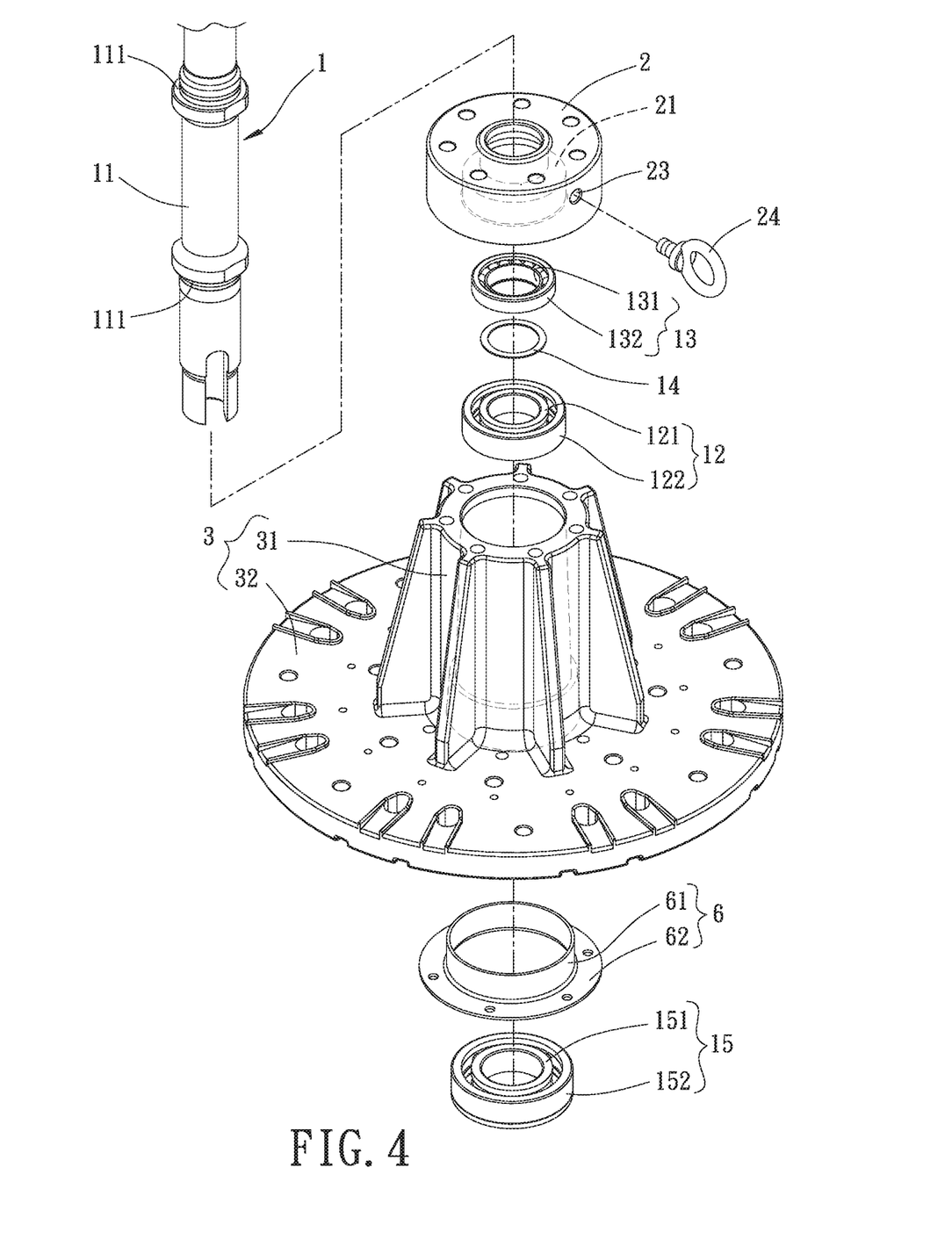
FIG. 4 is an exploded, perspective view of the ceiling fan of the first embodiment of the invention.

Referring to FIGS. 3 and 4, the support unit 1 includes an axle 11, extending along an axial direction, fixed to a predetermined object such as the ceiling. The axle 11 having a first end and a second end opposite the first end in the axial direction. The axle 11 includes a shoulder portion 111, protruding radially outward from the axle 11, with which a bearing 12 is engaged. In a non-limiting example, the bearing 12 includes an inner race 121 and an outer race 122 concentric with the inner race 121. The inner race 121 is fit around the axle 11 and abuts the shoulder portion 111. The outer race 122 is radially outward of the inner race 121 and can rotate relative to the inner race 121.

With regard to the motor suitable for use in a large ceiling fan, the support unit 1 preferably further includes a support bearing 13 coupled with the axle 11. The support bearing 13 includes a retaining ring 131 fit around the axle 11. The retaining ring 131 can abut the inner race 121 of the bearing 12. Alternatively, a buffering pad 14 is sandwiched between the retaining ring 131 and the inner race 121 of the bearing 12. The buffering pad 14 is flexible (such as rubber or the like) and is fit around the axle 11 for absorption of the vibration, reducing the vibration force between the support bearing 13 and the bearing 12 and reinforcing the engagement between the support bearing 13 and the bearing 12. The support bearing 13 further includes a rotating ring 132 outwardly of or located above the retaining ring 131. The rotating ring 132 can rotate relative to the retaining ring 131. Each of the retaining ring 131 and the rotating ring 132 includes a force-bearing face mainly for bearing the axial force. In the presence of the buffering pad 14, the buffering pad 14 is preferably not in contact with the rotating ring 132 and the outer race 122 of the bearing 12.

Besides, to improve the stability in rotation, the support unit 1 in this embodiment further includes an auxiliary bearing 15 below the bearing 12. The auxiliary bearing 15 is spaced from the bearing 12 at a predetermined distance. The bearing 12 is located between the auxiliary bearing 15 and the support bearing 13. Similar to the bearing 12, the auxiliary bearing 15 also includes an inner race 151 and an outer race 152. The inner race 151 is fit around the axle 11 and abuts another shoulder portion 111. The inner race 151 is concentric with the outer race 152. The outer race 152 is outward of the inner race 151 and can rotate relative to the inner race 151.

The first rotating part 2 is fit around the axle 11. The support bearing 13 is located in and coupled with the first rotating part 2. The first rotating part 2 can rotate relative to the axle 11. Specifically, the inner side/periphery of the first rotating part 2 in the embodiment can form an abutting portion 21 through the diameter difference. Further, a first abutting face 21a and a second abutting face 21b are provided in the inner side of the first rotating part 2. The bearing 12 is configured to contact/abut with the shoulder portion 111 and the first abutting face 21a. The rotating ring 132 of the support bearing 13 can abut the abutting portion 21 and the second abutting face 21b to permit synchronous rotation of the first rotating part 2 and the rotating ring 132.

Since the first rotating part 2 and the support bearing 13 are the main components that support the rotating parts of the motor, the first rotating part 2 is preferably made of a material with a higher rigidity such as iron or steel. The first rotating part 2 preferably includes an oil chamber 22 for accommodation of the support bearing 13. The oil chamber 22 is filled with lubricant (such as grease), such that the lubricant can improve the smoothness in rotation of the rotating ring 132 of the support bearing 13. Besides, the first rotating part 2 in this embodiment can have a screw hole 23 extending from the outer periphery to the inner periphery of the first rotating part 2, allowing for the injection of the lubricant into the oil chamber 22. Afterwards, a screwing ring 24 is engaged with the screw hole 23 to prevent the lubricant from flowing out of the oil chamber 22. The motor can be taken out of the package box by hanging up the screwing ring 24, thereby assisting in the removal of the motor.

The second rotating part 3 is coupled with the first rotating part 2, such that the first rotating part 2 and the second rotating part 3 can rotate jointly. The second rotating part 3 is coupled with the rotatable part of the motor such as the rotor 4. The stator 5 is connected to the support unit 1 and is lower than the auxiliary bearing 15. The stator 5 is electrified to excite the magnetic field of the rotor 4, permitting the rotor 4 to drive the rotatable part of the motor to jointly rotate about the axle 11.

Specifically, the second rotating part 3 in this embodiment includes a tubular portion 31 and a disc portion 32. The disc portion 32 is coupled with the outer periphery of the tubular portion 31 at the bottom end of the tubular portion 31. The top of the second rotating part 3 can abut the bottom of the first rotating part 2 while several fasteners S extend through the first rotating part 2 to be screwed into the second rotating part 3. A plurality of air-driving units 7 is mounted to the disc portion 32 to form a ceiling fan, as elaborated later.

In this embodiment, the inner periphery of each of the tubular portion 31 and the first rotating part 2 jointly abuts the outer periphery of the outer race 122 of the bearing 12, thereby ensuring the concentricity between the first rotating part 2 and the second rotating part 3. In the axial direction of the axle 11, the interconnected part of the tubular portion 31 and the first rotating part 2 is preferably around the middle of the outer periphery of the outer race 122. This ensures that the outer race 122 has substantially the same contact area with the tubular portion 31 and the first rotating part 2, reinforcing the engagement between the outer race 122 and the tubular portion 31 and the first rotating part 2. Furthermore, the inner periphery of the disc portion 32 is coupled with the tubular portion 31 of the second rotating part 3, or with the outer periphery of the outer race 152 of the auxiliary bearing 15. In this arrangement, the rotation of the second rotating part 3 can remain stable through the use of the bearing 12 and the auxiliary bearing 15.

It is noted that the weight of the rotor 4 and the plurality of air-driving units 7 (which are mounted to the second rotating part 3) is mainly transmitted to the rotating ring 132 of the support bearing 13 through the abutting portion 21 of the first rotating part 2. As a result, the second rotating part 3 supports less weight than the first rotating part 2 does. Thus, in the embodiment, the second rotating part 3 can be made of a different material from the first rotating part 2. In other words, the second rotating part 3 can have a lower rigidity than the first rotating part 2 as long as the second rotating part 3 can provide a reliable engagement for the rotor 4 and the plurality of air-driving units 7. Preferably, the second rotating part 3 is made of a lightweight material such as aluminum, magnesium, aluminum alloy, magnesium alloy or aluminum-magnesium alloy to reduce its weight, which consequently reduces the weight of the motor.

Moreover, when the rigidity of the second rotating part 3 is lower than that of the first rotating part 2, the motor preferably further includes an inner sleeve 6 coupled with the inner periphery of the second rotating part 3. This permits the second rotating part 3 to indirectly abut the outer race 152 through the inner sleeve 6. In the above arrangement, the rigidity of the inner sleeve 6 is higher than that of the second rotating part 3. Thus, the auxiliary bearing 15 can be abutted by the inner sleeve 6 (which has a higher rigidity) rather than the second rotating part 3 (which has a lower rigidity), which avoids the abrasion of the second rotating part 3. In a non-limiting example, the inner sleeve 6 is made of steel or iron which is the same as the first rotating part 2. In this embodiment, the inner sleeve 6 includes an annular wall 61 and an annular flange 62 extending outwards from the bottom end of the annular wall 61. The annular wall 61 abuts the inner periphery of the tubular portion 31. The annular flange 62 abuts the bottom face of the disc portion 32. In this regard, a plurality of fasteners S extends through the annular flange 62 to securely screw the inner sleeve 6 to the disc portion 32. Alternatively, the inner sleeve 6 is press fit with the tubular portion 31. The invention is not limited to either option.

Based on the above structure, during the assembly of the motor of the embodiment, the inner race 121 and the retaining ring 131 are fit around the axle 11 first from the first end. Next, the first rotating part 2 is fit around the axle 11 also from the first end, such that the rotating ring 132 abuts the abutting portion 21 and the second abutting face 21b, and the inner periphery (the first abutting face 21a) of the first rotating part 2 is securely coupled with the outer periphery of the outer race 122. Next, the axle 11 is tipped over to fit the second rotating part 3 around the axle 11 from the second end. Therefore, the inner periphery of the second rotating part 3 is securely coupled with the outer periphery of the outer race 122 at one end of the second rotating part 3. Then, the inner race 151 of the auxiliary bearing 15 is fit around the axle 11, in which the inner periphery of the second rotating part 3 (or of the inner sleeve 6) is coupled with the outer race 152 of the auxiliary bearing 15 at the other end of the second rotating part 3. Finally, the first rotating part 2 is screwed to the second rotating part 3 to complete the assembly. In the above, since the first rotating part 2 is coupled with the bearing 1 at the end thereof and since the second rotating part 3 is coupled with the auxiliary bearing 15 at the end thereof, the assembly of the motor of the embodiment is convenient. Also, it can be readily checked that whether the bearing 12 and the auxiliary bearing 15 are properly mounted, thereby significantly improving the convenience, efficiency and quality in assembly.

On the other hand, the motor according to the embodiment can support the weight of the entire rotating parts of the motor via the support bearing 13 that is configured to support the axial force, thus significantly reducing the burden of other bearings 12 and 15. Advantageously, the other bearings 12 and 15 can be implemented by general ball bearings instead of expensive specific-purpose bearings that are particularly used to support a heavy weight. This also ensures the stable rotation of the rotating parts of the motor while the total cost of the support bearing 13 and the other bearings 12 and 15 is significantly lower than the cost of a single specific-purpose bearing. Thus, the embodiment can reduce the cost of the motor and accordingly improves the competitiveness of the product.

Referring to FIGS. 2 and 3 again, the aforementioned motor can be mounted with the plurality of air-driving units 7 to form a ceiling fan. In this embodiment, each air-driving unit 7 includes a blade 71 and a screwing slat 72. The screwing slat 72 is connected to the disc portion 32 of the second rotating part 3 and an end of the blade 71. In this arrangement, the blades 71 can be annularly arranged around the axle 11.

Figure 5:
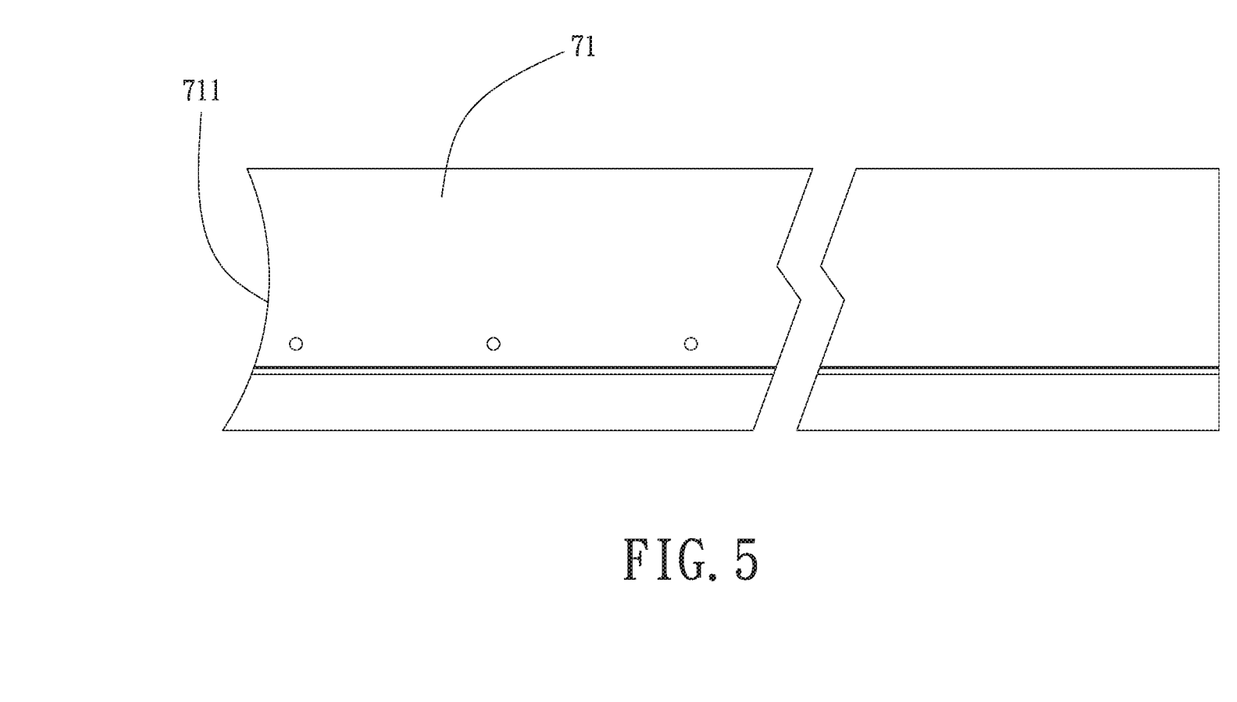
FIG. 5 is a plain view of a blade for the ceiling fan of the first embodiment of the invention.

Referring to FIGS. 2, 3 and 5, the blade 71 has an inner end face 711 having a shape matching the outer periphery of the disc portion 32. Namely, the inner end face 711 of the blade 71 can curve inwardly such that the blade 71 matches with the outer periphery of the disc portion 32 when the blades 71 are annularly coupled with the outer periphery of the disc portion 32. In this arrangement, there is no obvious gap between the inner end face 711 of the blade 71 and the outer periphery of the disc portion 32. As a result, the ceiling fan will look better when a user views the ceiling fan from the bottom up. In a non-limiting example, the inner end face 711 of the blade 71 is formed by laser cutting.

Figure 6:
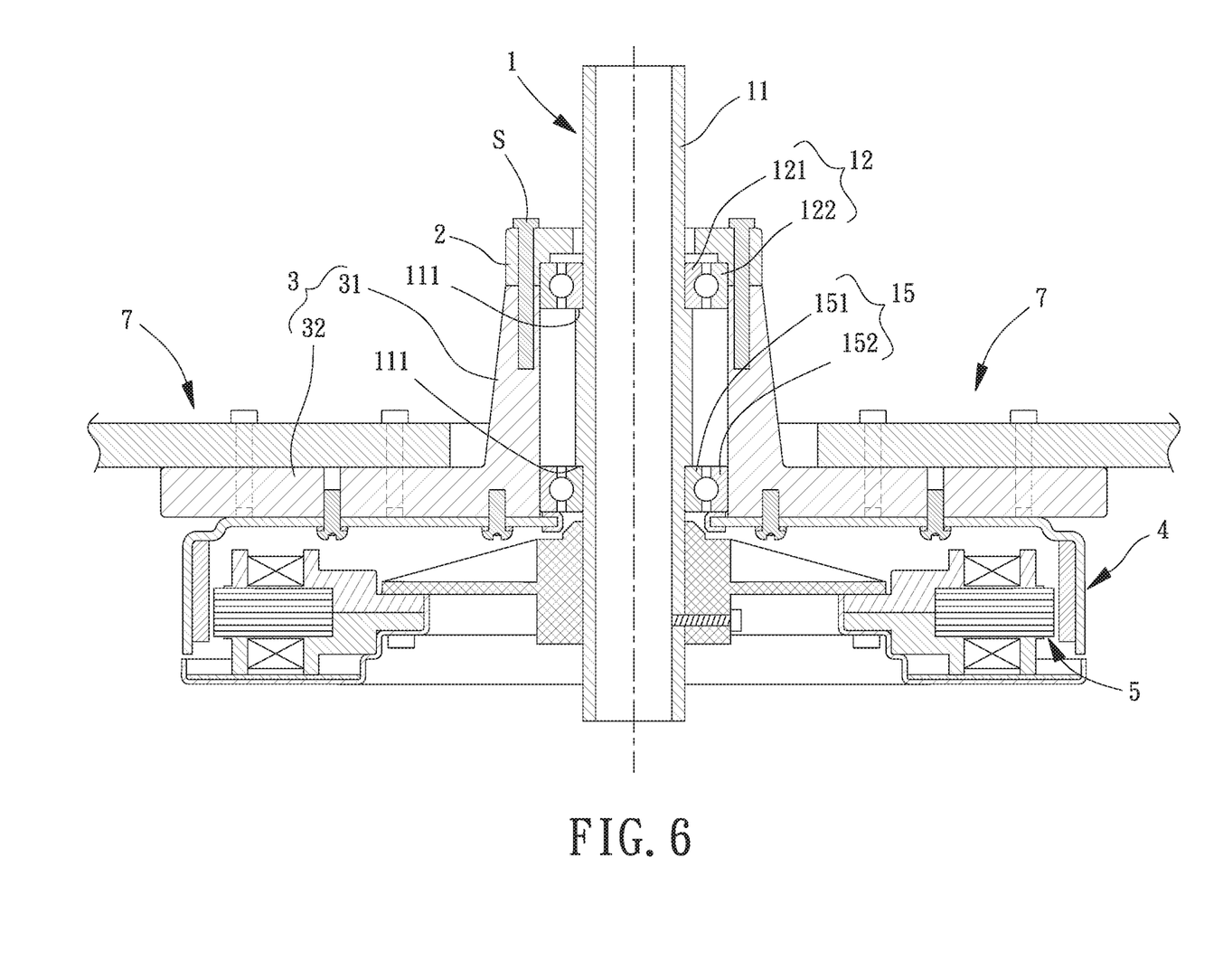
FIG. 6 is a cross sectional view of a ceiling fan according to a second embodiment of the invention.

FIG. 6 shows a motor according to a second embodiment of the invention. The motor of the second embodiment is suitable for use in a general-size ceiling fan rather than the large-size ceiling fan discussed in the first embodiment above. However, the motor of the second embodiment is suitable for a general-size ceiling fan where the bearing 12 is replaced with a specific-purpose bearing that is particularly used to support a heavy weight. Therefore, the support unit 1 in this embodiment does not include the support bearing 13 (shown in FIG. 3). In this embodiment, the inner periphery of the first rotating part 2 abuts the outer race 122 of the bearing 12, and the tubular portion 31 of the second rotating part 3 abuts the outer race 122 of the bearing 12. This also ensures the concentricity between the first rotating part 2 and the second rotating part 3.

Based on the above structure, during the assembly of the motor, the inner race 121 of the bearing 12 can be fit around the axle 11. Then, the first rotating part 2 is fit around the axle 11 such that the inner periphery of the first rotating part 2 is coupled with the outer race 122 of the bearing 12. Next, the axle 11 is tipped over to fit the second rotating part 3 around the axle 11. Therefore, the inner periphery of the second rotating part 3 is securely coupled with the outer periphery of the outer race 122 at one end of the second rotating part 3. Then, the inner race 151 of the auxiliary bearing 15 is fit around the axle 11, in which the inner periphery of the second rotating part 3 (or of the inner sleeve 6) is coupled with the outer race 152 of the auxiliary bearing 15 at the other end of the second rotating part 3. Finally, the first rotating part 2 is screwed to the second rotating part 3 to complete the assembly. In the above, since the first rotating part 2 is coupled with the bearing 12 at the end thereof and since the second rotating part 3 is coupled with the auxiliary bearing 15 at the end thereof, the assembly of the motor of the embodiment is convenient. Also, it can be easily checked that whether the bearing 12 and the auxiliary bearing 15 are properly mounted, thereby significantly improving the convenience, efficiency and quality in assembly.

In summary, in the motor and the ceiling fan including the motor according to the invention, the rotating mechanism of the motor can be separated into different parts (two parts in the above embodiments), in which each of the rotating parts is coupled with the respective bearing at the end thereof. In this arrangement, the assembly of the motor is convenient. Also, it can be easily checked that whether the individual bearings are properly assembled, thereby significantly improving the convenience, efficiency and quality in assembly.

Besides, in the motor and the ceiling fan including the motor according to the invention, the rotating mechanism can be separated into different parts such that said parts of the rotating mechanism can have different material design choices according to the location thereof. Advantageously, the weight and cost of the motor can be reduced while the required wearability of the rotating parts can be maintained. Thus, the flexibility of the motor design is improved.

Although the invention has been described in detail with reference to its presently preferable embodiments, it will be understood by one of ordinary skill in the art that various modifications can be made without departing from the spirit and the scope of the invention, as set forth in the appended claims

What is claimed is:

1. A motor comprising:
  a support unit including:
    an axle extending along an axial direction, the axle having a first end and a second end opposite the first end in an axial direction, and the axle having a shoulder portion protruding radially outward from the axle;
    a bearing coupled with the axle by fitting around the shoulder portion from the first end;

a support bearing coupled with the axle from the first end; and an auxiliary bearing coupled with a portion of the axle adjacent to the second end, wherein the auxiliary bearing and the bearing are spaced apart from each other by a distance in the axial direction;

a first rotating part having an abutting portion, a first abutting face and a second abutting face respectively located on an inner side of the first rotating part, the first rotating part fitting around the axle from the first end, the bearing contacting to the first abutting face, and the support bearing contacting the abutting portion and the second abutting face;

a second rotating part coupled with the first rotating part from the second end, wherein the second rotating part includes an inner space, wherein the bearing is partially received in the inner space, and wherein the auxiliary bearing is received in the inner space;

a rotor coupled with the second rotating part; and a stator connected to the support unit.

2. The motor as claimed in claim 1, wherein the bearing includes an inner race coupled with the axle and an outer race radially aligned with the inner race, wherein the inner side of the first rotating part and an inner side of the second rotating part abuts the outer race of the bearing, wherein the support bearing includes a retaining ring fit around the axle and a rotating ring rotatable relative to the retaining ring, and wherein the rotating ring abuts an abutting portion formed on an inner periphery of the first rotating part.

3. The motor as claimed in claim 2, wherein an interconnected part of the first rotating part and the second rotating part is around a middle of an outer periphery of the outer race of the bearing.

4. The motor as claimed in claim 2, further comprising a buffering pad sandwiched between the retaining ring and the inner race of the bearing and fit around the axle, wherein the buffering pad is off contact with the rotating ring and the outer race of the bearing.

5. The motor as claimed in claim 2, wherein the first rotating part includes an oil chamber, and wherein the support bearing is disposed in the oil chamber.

6. The motor as claimed in claim 5, wherein the first rotating part has a screw hole extending from an outer periphery to the inner side of the first rotating part and intercommunicating with the oil chamber of the first rotating part, and wherein a screwing ring is engaged with the screw hole.

7. The motor as claimed in claim 1, wherein a rigidity of the second rotating part is lower than a rigidity of the first rotating part.

8. The motor as claimed in claim 7, wherein the first rotating part is made of iron or steel, and wherein the second rotating part is made of aluminum, magnesium, aluminum alloy, magnesium alloy or aluminum-magnesium alloy.

9. The motor as claimed in claim 7, wherein the auxiliary bearing has an inner race coupled with the axle and an outer race radially aligned with the inner race thereof, wherein an inner sleeve is coupled with an inner side of the second rotating part and abuts the outer race of the auxiliary bearing, and wherein a rigidity of the inner sleeve is larger than a rigidity of the second rotating part.

10. The motor as claimed in claim 9, wherein the inner sleeve is made of iron or steel, and wherein the second rotating part is made of aluminum, magnesium, aluminum alloy, magnesium alloy or aluminum-magnesium alloy.

11. A ceiling fan comprising:

the motor as claimed in claim 1; and a plurality of air-driving units coupled with the second rotating part.

12. The ceiling fan as claimed in claim 11, wherein the second rotating part includes a tubular portion coupled with the first rotating part and a disc portion connected to an outer periphery of the tubular portion, wherein each of the plurality of air-driving units includes a blade having an inner end face, and wherein a shape of the inner end face of the blade matches a shape of an outer periphery of the disc portion.

13. The ceiling fan as claimed in claim 12, wherein the inner end face of each blade is formed by laser cutting.

14. The motor as claimed in claim 1, wherein an axial length of the second rotating part in the axial direction is greater than an axial length of the first rotating part in the axial direction.

15. The motor as claimed in claim 3, wherein the first rotating part and the second rotating part only contact an outer periphery of the outer race of the bearing.

16. The ceiling fan as claimed in claim 11, wherein the first rotating part and the second rotating part only contact an outer periphery of the outer race of the bearing.

* * * * *